United States Patent
Zyskowski et al.

(10) Patent No.: US 10,067,950 B1
(45) Date of Patent: Sep. 4, 2018

(54) SYSTEMS AND METHODS FOR EFFICIENTLY ORGANIZING MAP STYLING INFORMATION

(71) Applicant: GOOGLE INC., Mountain View, CA (US)

(72) Inventors: Jamie Zyskowski, Seattle, WA (US); Scott Shawcroft, Mountain View, CA (US); Sean Egan, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 260 days.

(21) Appl. No.: 14/750,903

(22) Filed: Jun. 25, 2015

Related U.S. Application Data (60) Provisional application No. 62/017,163, filed on Jun. 25, 2014.

(51) Int. Cl.
*G06T 11/20* (2006.01)
*G06T 7/00* (2017.01)
(Continued)

(52) U.S. Cl.
CPC ...... *G06F 17/30241* (2013.01); *G06T 7/0044* (2013.01); *G06T 7/0051* (2013.01); *G06T 7/2006* (2013.01); *G06T 11/203* (2013.01); *G06T 11/206* (2013.01); *G06T 11/60* (2013.01); *G06T 17/05* (2013.01);
(Continued)

(58) Field of Classification Search
CPC ............. G06F 17/30241; G06T 7/0044; G06T 7/0051; G06T 7/2006; G06T 11/203; G06T 11/206; G06T 11/60; G06T 17/05; G06T 2200/24; G06T 2207/10004;
(Continued)

(56) References Cited

U.S. PATENT DOCUMENTS 8,274,524 B1 * 9/2012 Cornell ............... G08G 1/0969
345/428

OTHER PUBLICATIONS

Klostermeyer, Data Structure, 2011, URL: https://www.unf.edu/~wkloster/3540/wiki_book.pdf, pp. 587.*
(Continued)

*Primary Examiner* — Mark K Zimmerman
*Assistant Examiner* — Phuc N Doan
(74) *Attorney, Agent, or Firm* — Marshall, Gerstein & Borun LLP (57) ABSTRACT

To organize configuration parameters for rendering map features on digital maps, a data structure storing multiple nodes is generated. Respective sets of map feature attributes and configuration parameters are assigned to the nodes. The configuration parameters specify visual attributes for rendering map features. Indications of relationships between the nodes are generated, where at least several of the nodes include several child nodes. An indication of one or more map feature attributes to which a certain map feature belongs is received, and the data structure is traversed according to the indicated relationships between the nodes to generate a set of configuration parameters for rendering the map feature. Traversing the data structure includes comparing the indicated map feature attribute or map feature attributes to sets of map feature attributes at some of the nodes, such that the generated set of configuration parameters includes configuration parameters from at least two of the nodes.

17 Claims, 6 Drawing Sheets

(51) Int. Cl.
    *G06F 17/30* (2006.01)
    *G06T 11/60* (2006.01)
    *G06T 7/20* (2017.01)
    *G06T 17/05* (2011.01)
(52) U.S. Cl.
    CPC .............. *G06T 2200/24* (2013.01); *G06T 2207/10004* (2013.01); *G06T 2207/10028* (2013.01); *G06T 2207/20144* (2013.01); *G06T 2207/30232* (2013.01); *G06T 2207/30236* (2013.01)
(58) Field of Classification Search
    CPC . G06T 2207/10028; G06T 2207/20144; G06T 2207/30232; G06T 2207/30236
    See application file for complete search history.

(56) References Cited

OTHER PUBLICATIONS

Valiente, Algorithms on Trees and Graphs, Springer Science & Business Media, 2013, total 1 page.*
Jin, Path-tree: An efficient reachability indexing scheme for large directed graphs, ACM Transactions on Database Systems (TODS) TODS Homepage archive vol. 36 Issue 1, Mar. 2011, pp. 52.*

* cited by examiner

SYSTEMS AND METHODS FOR EFFICIENTLY ORGANIZING MAP STYLING INFORMATION

FIELD OF TECHNOLOGY

This disclosure relates to interactive digital maps and, more particularly, to configure rendering behavior used to render map features on digital maps.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Interactive digital maps, which various geographic applications display on computing devices, generally depict numerous geographic features, such as roads, outlines of countries and towns, bodies of water, buildings, etc. Some of these geographic features can be depicted differently in different contexts. For example, a road normally depicted as a blue line can be rendered in red to illustrate heavy traffic, or the boundary of a county can be highlighted in response to a geographic query.

SUMMARY

Generally speaking, a system of this disclosure organizes indications of line thickness, line color, fill color, and other configuration parameters for rendering features on digital maps into a data structure that allows operators to describe the features in terms of parent/child/sibling relations. For an example, an operator can specify certain configuration parameters for "roads," indicate that "small roads" derive configuration parameters from "roads" according to a child-parent relationship, and specify additional configuration parameters for "small roads." The system also can automatically generate tables of configuration parameters for map features using the data structure, where a digital geographic application operating in a client device uses the tables to render map features and re-render the map features by "restyling" same feature geometry.

More particularly, one implementation of these techniques is a method for organizing configuration parameters for rendering map features on digital maps. The method, which can be executed on one or more computing devices, includes generating a data structure storing data for multiple nodes, including assigning to the nodes (i) respective sets of map feature attributes and (ii) respective sets of configuration parameters that specify visual attributes for rendering map features. The method also includes generating indications of relationships between the nodes, where at least several of the nodes include several child nodes. Further, the method includes receiving an indication of one or more map feature attributes to which a certain map feature belongs and traversing the data structure according to the indicated relationships between the nodes to generate a set of configuration parameters for rendering the certain map feature. Traversing the data structure includes comparing the indicated one or more map feature attributes of the certain map feature to sets of map feature attributes at some of the nodes, such that the generated set of configuration parameters includes configuration parameters from at least two of the plurality of nodes.

Another implementation of these techniques is a method for providing configuration parameters for rendering map features on client devices, executed on one or more computing devices. The method includes accessing a data structure that implements a graph having multiple nodes, where each node indicates (i) a respective set of map feature attributes and (ii) a respective set of configuration parameters that specify visual attributes for rendering map features. The data structure indicates at least parent-child relationships between the nodes. The method includes traversing at least a portion of the data structure according to the indicated relationships between the nodes to generate a flattened representation of at least a portion of the data structure, where the traversing includes combining configuration parameters for at least two of the nodes to generate a set of configurations of parameters. The method also includes causing the flattened representation to be transmitted to a client device via a communication network, for applying to map features when rendering a digital map.

Yet another implementation is a system including a non-transitory computer-readable memory and processing hardware coupled to the computer-readable memory. The processing hardware configured to generate data structure storing data for multiple nodes, including assigning to the nodes (i) respective sets of map feature attributes and (ii) respective sets of configuration parameters that specify visual attributes for rendering map features. The processing hardware is further configured to generate indications of relationships between the nodes, where at least several of the nodes include several child nodes, receive an indication of one or more map feature attributes of a certain map feature, and traverse the data structure according to the indicated relationships between the nodes to generate a set of configuration parameters for rendering the certain map feature. To traverse the data structure, the processing hardware is configured to compare the indicated one or more map feature attributes of the certain map feature to sets of map feature attributes at some of the nodes, so that the generated set of configuration parameters includes configuration parameters from at least two of the nodes.

DETAILED DESCRIPTION OF THE DRAWINGS

General Overview

A system efficiently organizes sets of visual attributes (or "configuration parameters") for rendering map features or ranking labels, or components of a digital map, on client devices. A set of configuration parameters for a certain configurations can include, for example, a particular line thickness, a particular fill color, and a particular outline color. Map features can be, for example, two- and three-dimensional shapes representing roads, building footprints, bodies of water, boundaries of cities, and other geographic entities.

In an example scenario, a user operating a client device requests a digital map of a certain geographic area via a geographic application. The digital map includes the depiction of a road as a blue polyline three pixels wide, among other map features. The user then operates a user interface control to activate the display of current traffic conditions on the digital map. In response, the geographic application applies new configuration parameters to the same road centerline, which defines the geometry of this map feature, to depict the road a red polyline five pixels wide. In other words, the geographic application can reconfigure one or several map features on a digital map by using new visual attributes with "old" map feature geometry. This approach allows geographic applications to change visual attributes of map features quickly and efficiently (e.g., when restyling to turn on traffic, bicycle paths, night mode and other time-of-day display, or activate a hybrid display of map data and satellite imagery), easily cache configuration parameters to support map functionality in the offline mode, and operate consistently on different hardware platforms, for example.

To organize configuration parameters, the system of this disclosure constructs a data structure that represents a graph with named nodes, such as "water," "city," and "country." Each node can include configuration parameters for rendering map features at one or several zoom levels (or more broadly, scales) and, in some cases, for interpolating configuration parameters between zoom levels. Each node also can include indications of one or several types of features to which the configuration parameters can apply. In some cases, the filter defines the category. An example filter in a node "city" lists types "locality," "neighborhood," and "sub-locality." Further, the nodes are interconnected so as to define hierarchical relationships between sets of configuration parameters and, in some implementations, "older/younger" sibling relationships between child nodes of a common parent node. Thus, for example, the node named "city" can have child nodes named "small city" and "well-known city," respectively. In at least some example implementations, the data structure implements a Directed Acyclic Graph (DAG), which can be represented by a text protocol buffer file.

To generate a complete set of configuration parameters for a feature of a certain specified type, the system traverses the data structure according to certain principles (e.g., starting at the root, selecting an older sibling prior to a younger sibling, stopping the traversal when the node has no child nodes) and compares the map feature attributes, such as the type, to the filter of the node being visited. When the map feature attributes matches the filter, the system applies the styling parameters to the feature, and traversal continues to the next level of hierarchy when the node has child nodes. In this manner, a set of configuration parameters can be constructed from data associated with multiple nodes. For example, a feature can acquire configuration parameters $S_2$ from a parent node and configuration parameters $S_1$ from a child node. When configuration parameters at different levels of hierarchy refer to the same visual attribute, the configuration parameters of the child node override the configuration parameters of the parent node, according to some implementations.

To traverse the data structure more efficiently, the system can implement a rule according to which at most one sibling can be matched to a feature, and the test against a set of siblings stops upon finding the first match.

In one example implementation, one or more network servers generate, update, and otherwise maintain the data structure in order to efficiently generate style tables for use on client devices. As a more specific example, the one or more network servers can traverse the graph, or a relevant portion of the graph, in a depth-first manner to generate path identifiers and a flattened style table, where each path identifier corresponds to an index into the flattened style table. Client devices can use the style tables to re-style map features by applying new visual attributes without re-requesting feature geometry, interpolate visual attributes between zoom levels, and otherwise render features in line with a principle of separating feature geometry from feature styling.

According to other network topologies, however, one or more network servers generate style tables for use by other network servers. In one such topology, back-end servers generate style tables and provide the style tables to front-end servers. The front-end servers then use the style tables to generate rasterized (bitmap) map images for presentation at client devices.

Further, a user interface can be implemented for user experience (UX) engineers and/or other operators to construct the graph and assign configuration parameters to various nodes. The system can enforce certain rules, such as requiring that a node declare its nearest older sibling, to help operators avoid ambiguous or erroneous combinations of configuration parameters. The rule can operate in conjunction with the principle that, for a given set of sibling nodes, the nodes are tested oldest-to-youngest, with the first match with the filter ending the test. In an example scenario, an operator may decide between defining a node "local road" as a child of "road" (in which case "local road" will inherit the configuration parameters of "road") or as a sibling of "road" (in which case "local road" can have configuration parameters independent of the configuration parameters of "road," except for those both "local road" and "road" may inherit from a common parent). When the operator declares the nearest older sibling for a node, he or she is more likely to notice overlaps in filters and/or other erroneous definitions, if the rule outline above is enforced.

Overview of an Example System and Client Device

Figure 1:
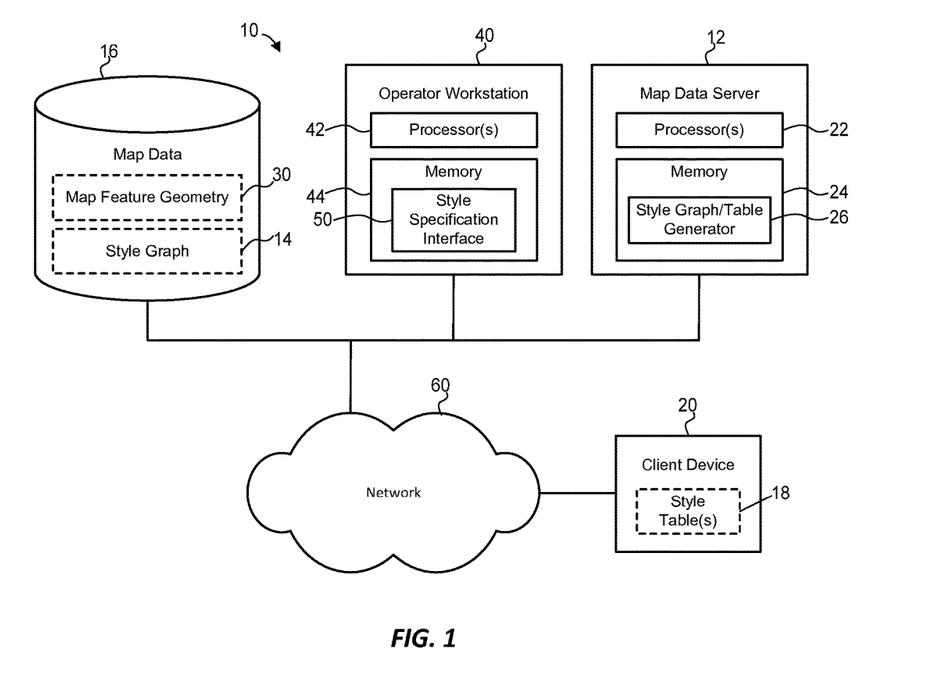
FIG. 1 is a block diagram of an example computing system in which configuration parameters can be organized according to the techniques of this disclosure.

FIG. 1 illustrates an example system 10 in which a map data server 12 organizes configuration parameters for rendering map features into a style graph 14, stored as a data structure on a computer-readable memory in a map database 16. The map data server 12 also generates style tables, such as one or several style table(s) 18, for use at a client devices 20 and other devices.

More particularly, the map data server 12 can include processing hardware such as one or more processor(s) 22 coupled to a memory 24. A set of instructions stored in the memory 22 can implement a style graph/table generator 26. When executed on the one or more processor(s) 20, the instructions operate to support such example functions as initial creation of the style graph 14, addition or deletion of new nodes of the style graph 14, and generation of the style table(s) 18 or similar tables. More generally, the style graph/table generator 26 can support any number of functions related to management of data structure(s) storing configuration parameters and using the data structure(s) to provide appropriate configuration parameters to client devices.

In addition to the style graph 14, the map database 16 stores map feature geometry 30. For example, the map feature geometry 30 can include a description of road geometry as a polyline made up of a sequence of vertices, and a description of a building footprint as a polygon. The map data server 12 can provide relevant portions of the map feature geometry 30 along with styling parameters derived from the style graph 14 to the client device 20 for rendering digital maps. Thus, the map data server 12 provides map data to the client device 20 according to the principle of separating feature geometry from map feature styling. This principle is discussed in more detail below.

With continued reference to FIG. 1, an operator such as a UX engineer can use a workstation 40 to specify configuration parameters for managing the style graph 14. The workstation can include one or more processor(s) 42 coupled to a memory 44. A set of instructions stored in the memory 44 implement a style specification interface 50. In operation, the style specification interface 50 can provide to an operator a text-based and/or graphical representation of the current version of the style graph 14, controls for adding nodes of the style graph 14, controls for specifying configuration parameters for various nodes, controls for verifying compliance with rules according to which the style graph 14 is constructed, etc. Example functionality of the style specification interface 50 is discussed below in more detail.

The operator workstation 40, the map data server 12, and the map database 16 in general can be interconnected in any suitable manner, such as via a local area network or a wide area network. In the example implementation illustrated in FIG. 1, the components 12, 16, and 40 operate in a same local network. The client device 20 accesses the map data server 12 via a wide area communication network 60, which can be the Internet, for example. In general, however, these devices can operate according to any suitable network topology. For example, the operator workstation 40 and the map data server 12 in one implementation can be communicatively coupled via the network 60.

For simplicity, FIG. 1 illustrates only one instance of a map data server 12. However, the map data server 12 in other implementations can include multiple devices capable of communicating with each other, arranged according to any suitable scheme.

Figure 2:
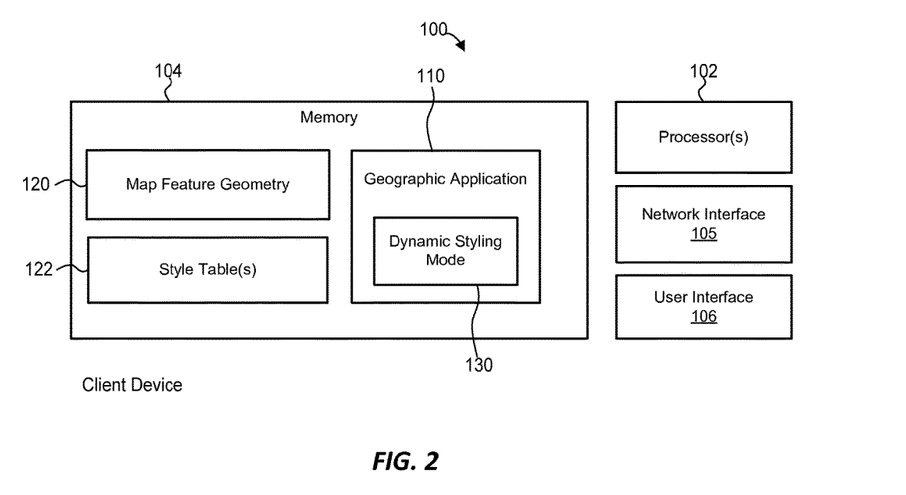
FIG. 2 is a block diagram of an example client device that can operate in the system of FIG. 1.

FIG. 2 is a block diagram of an example computing device 100, which can operate in the system 10 as the client device 20, for example. However, the client device 20 in general can be implemented in any suitable manner. The client device 100 can be, for example, a laptop computer, a smart phone, or a tablet computer. The client device 100 includes one or more processor(s) 102, a computer-readable memory 104, a network interface 105, and a user interface 106. In some implementations, the one or more processor(s) 102 include a central processing unit (CPU) as well as a graphics processing unit (GPU) for efficiently rendering graphics content. The user interface 106 can include such components as, for example, a screen, a touchscreen, a keyboard, a microphone, one or more speakers, etc. The memory 104 can be a non-transitory memory including persistent (e.g., flash drive) and/or non-persistent (e.g., RAM) components.

The memory module 104 stores instructions that implement a geographic application 110, which can be a special-purpose mapping application or a general-purpose application such as a web browser that includes a mapping application programming interface (API), for example. The geographic application 110 can generate interactive digital maps of geographic areas, provide navigation instructions, facilitate execution of geospatial queries, and perform other geographic functions.

The memory module 104 also stores map feature geometry 120, which the geographic application 110 can receive from a network server such as the map data server 12 of FIG. 1. The geographic application 110 also can receive one or several table(s) 112 from the network server. As discussed in more detail below, the style graph/table generator 26 or a similar component can generate the one or several table(s) 112 by traversing the style graph 14 partially or in its entirety. A dynamic styling module 130 can look up and apply configuration parameters in the style table(s) 112 to the map feature geometry 120 to generate a digital map.

Separating Map Feature Geometry from Map Feature Styling

Referring to both FIGS. 1 and 2, the user of the client device 20 can submit a request for a "base" map of the borough of Manhattan at zoom level $Z_1=14$, and the map data server 12 in response can provide appropriate map feature geometry along with configuration parameters for those map features that are included in the map feature geometry. In some implementations, the map data server 12 provides configuration parameters that specify how map features should be rendered at zoom level $Z_1=14$ as well as at $Z_2=15$, so that the client device 20 can interpolate style data and render map features at intermediate zoom levels such as $Z_3=14.5$ or well as at $Z_4=14.9$, for example. Further, when the user wishes to view the same map of Manhattan with current traffic information, the map data server 12 can simply provide additional style definitions to the client device 20 without providing the same road geometry again, and the client device 20 can re-render some of the roads to indicate, for example, congested areas using thicker red strokes. Still further, when the client device 20 operates offline or has a slow network connection, the client device 20 in many cases can properly re-style a digital map by applying configuration parameters stored in local memory to the map features currently being displayed.

The map feature geometry 30 can describe geometries of various map features in a vector graphic format, or another suitable format for specifying geometric shapes using mathematical descriptions of points and paths connecting the points. For convenience, data conforming to any one of such formats is referred to as "vector data." Vector data generally allows client devices to scale, rotate, and otherwise operate on shapes without distortion. For example, rather than specifying each pixel that makes up a raster image of a line segment, vector data may specify the coordinates of two endpoints of the line segment and indicate that the two endpoints are connected by a straight line.

The map feature geometry 30 can define the outlines of various natural geographic features, such as rivers, mountains, and forests, as well as various artificial geographic features, such as roads, buildings, and parks. Moreover, the map feature geometry 30 in some cases can include outlines of political, administrative, and other divisions, such as states, counties, townships, etc.

In some implementations, the client device 20 implements a graphics pipeline that includes vertex shaders and fragment shaders to render vector data. For example, the graphics pipeline can be implemented in a graphics processing unit (GPU) and conform to the OpenGL ES standard. Generally speaking, vertex shaders and fragment shaders define two pipeline shading stages: vertex shaders that operate on vertices visible in a frame and fragment shaders that operate on "fragments," or sets of pixels that make up a frame. For example, the central processing unit (CPU) on client device 20 can create a collection of triangles (made up of points defined in two or three dimensions) and pass the collection of triangles to the GPU. For each triangle T in the collection, the GPU then can run a vertex shader on each vertex of triangle T, and a fragment shader on each pixel enclosed by triangle T.

The map data server 12 can organize feature geometry 30 into map tiles, which generally correspond to a two-dimensional organization of geospatial data into a quadtree, or data structure in which each non-leaf node has four children, or other trees with only two or more children, or more generally, any other suitable data structure. Each map tile in this case corresponds to a square geographic region, where the size of the square can depend on the zoom level. Thus, each map tile at a given zoom level is divided into four tiles at the next level, up to the highest zoom level. In operation, the map data server 12 can provide a set of map tiles $T_1$, $T_2$, ... $T_N$ to the client device 20 for rendering a digital map.

The map data server 12 also can provide configuration parameters that are generally independent of the map tiles and, more generally, of descriptions of map feature geometries. In particular, certain styles can apply to numerous map tiles, and the map data server 12 can provide the corresponding the configuration parameters once for use with multiple map tiles. The map data server 12 thus can eliminate duplication of configuration parameter data across map tiles, thereby decreasing the amount of data that needs to be transmitted to the client device 20 for generating a digital map. As indicated above, the client device 20 also can interpolate configuration parameters to determine how map features can be scaled in a seamless, non-disruptive manner.

Example server-side organization and maintenance of configuration parameters and generation of style tables for use on client devices is discussed next.

Organizing Configuration Parameters Using a Graph and Generating Style Tables

Figure 3A:
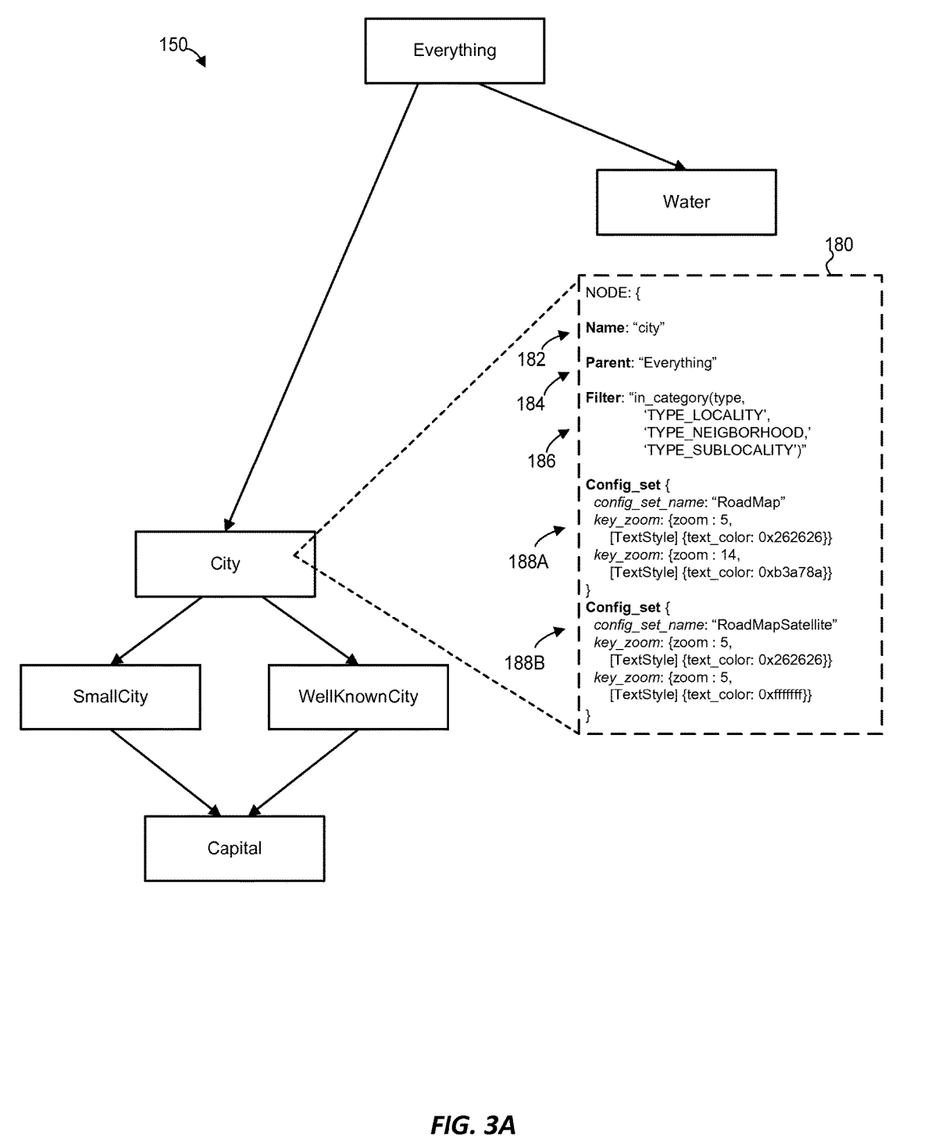
FIG. 3A is a diagram of a portion of an example data structure that stores configuration parameters according to the techniques of this disclosure.

Configuration parameters for map features can be organized in a data structure similar to a data structure 150 made up of multiple interconnected named nodes, which is illustrated in FIG. 3A. Referring back to FIG. 1, the style/graph table generator 26 or a similar module can generate the data structure 150, store the data structure as the style graph 14, and modify the data structure 150 in accordance with operator commands received via the operator workstation 40. The style/graph table generator 26 also can traverse the data structure 150 to generate sets of configuration parameters for various feature classifications. Examples of traversing the data structure 150 to derive configuration parameters for several map feature types are discussed below with reference to FIGS. 3B-D.

Referring now to FIG. 3A, the nodes of the data structure 150 can be named for operator convenience in accordance with the level, type(s) of map features, or geographic schemes for which the node stores configuration parameters. The nodes can be interconnected using parent/child/sibling relationship indicators stored as part of node-specific data, for example, or in any other suitable manner. FIG. 3A schematically illustrates relationships using arrows. It is noted that the nodes can include additional relationship indicators such as nearest-older-sibling or nearest-younger-sibling indicators, for example.

In this example, the data structure includes a root node named "Everything" with two child nodes, "Water" and "City." In one implementation, nodes "Water" and "City" inherit their style properties from the node "Everything." In other words, each of nodes "Water" and "City" can include the configuration parameters of node "Everything" as well as additional configuration parameters. Node "City" in this example has child nodes "SmallCity" and "WellKnownCity." Another node, "Captial," is a child of node "SmallCity" as well as node "WellKnownCity." Further, node "City" is an older sibling of node "Water," and node "SmallCity" is an older sibling of node "WellKnownCity." The relative "age" of siblings in the data structure 150 can determine the order in which a feature type is compared to node-specific filters: for example, when traversing, but not attaching, the data structure 150, the style/graph table generator 26 (see FIG. 1) can first test the map feature against the oldest sibling, then the next-oldest sibling, and proceed in this manner until the youngest sibling is reached.

In some implementations, the relationships between the nodes of the data structure 150 define a directed acyclic graph (DAG), with nodes corresponding to graph vertices and the relationships, illustrated as arrows in FIG. 3A, corresponding to edges. As a DAG, the data structure includes no cycles, so that no traversal of any portion of the data structure starting at a certain node N leads back to the same node N.

Each of the nodes of the data structure 150 can store, or be associated with, node-specific data. For example, node "City" stores data 180 including such data components as (i) a name indicator 182 ("City"), (ii) a parent indicator 184 (identifying node "Everything" as the only parent), (iii) a filter 186 identifying map feature attributes to which the configuration parameters of node "City" apply, and (iv) configuration sets 188A and 188B including configuration parameters, which can be scale-level-specific. The data 180 is provided only as an example. In general, nodes of the data structure 150 can include additional data components and/or omit some of the data components (i)-(iv) listed above.

The filter 186 in this example indicates that map features that have map feature attributes of type "locality," "neighborhood," and "sub-locality" match node "City." The filter 186 can list any number of map feature attributes. Moreover, the filter 186 in some cases can include a string that conforms to the Structured Query Language (SQL) format. In general, the filter 186 can have any desired level of complexity. The respective filters of the nodes in FIG. 3A can be selected as to define a single path of traversal for a map feature. In other words, the data structure 150 can conform to the principle that filters of siblings do not define overlapping ranges. However, in some implementations where other rules are implemented, such as the "one-sibling matching rule" discussed below, the data structure 150 may not confirm to this principle, and some filters of siblings can define overlapping ranges More particularly, the style/graph table generator 26 and/or the style specification interface 50 of FIG. 1 can enforce what can be referred to as the "one-sibling matching" rule, according to which a map feature can match the filter(s) of at most one sibling, so that a test against a set of siblings can end with the first match, and a map feature already matched to a sibling is not tested against the other siblings. Moreover, the siblings can be organized, or ranked, by "age" as discussed above to define a direction in which a test against a set of siblings can proceed. The siblings in general can be ranked in any suitable manner.

The configuration sets 188A and 188B describe style properties in a structured format. In particular, the configuration set 188A includes a set of configuration parameters that pertain to a road map. In other words, the map feature matching the filter 184 is styled according to the configuration set 188A when rendered as part of a digital map of type "road map." The configuration set 188B includes a set of configuration parameters that pertain to a satellite view of a road map. Each of the nodes in FIG. 5 can include any desired number of configuration sets for various types of maps in addition to road maps and satellite views of road maps, such as navigation maps or terrain maps, for example.

In this example, the configuration sets 188A and 188B specify respective text color attributes for styling text labels. As illustrated in FIG. 3A, each of the configuration sets 188A and 188B includes a configuration parameter type identifier "TextStyle" and, as part of text style description, specifies a respective color (e.g., text_color: 0xb3a78a) for operator convenience, for example. Text color attribute is "nested" in a definition of a text style because a description of a text style also can specify a certain font, for example. In general, a configuration set specifies one or several configuration parameters of any suitable type, such as line color, line thickness, fill color, etc.

Further, the configuration sets 188A and 188B list configuration parameters for specific zoom levels. The configuration set 188A specifies a certain text color for zoom level 5 and a different color for zoom level 14. Referring back to FIG. 1, the client device 20 can use these definitions to interpolate text color for the matching map features at zoom levels between 5 and 14. Again, configuration sets similar to the sets 188A and 188B in various scenarios can specify any visual attribute at one or multiple zoom levels, at least some of which can be interpolated: line thickness, line color, fill color, etc.

Figure 3B:
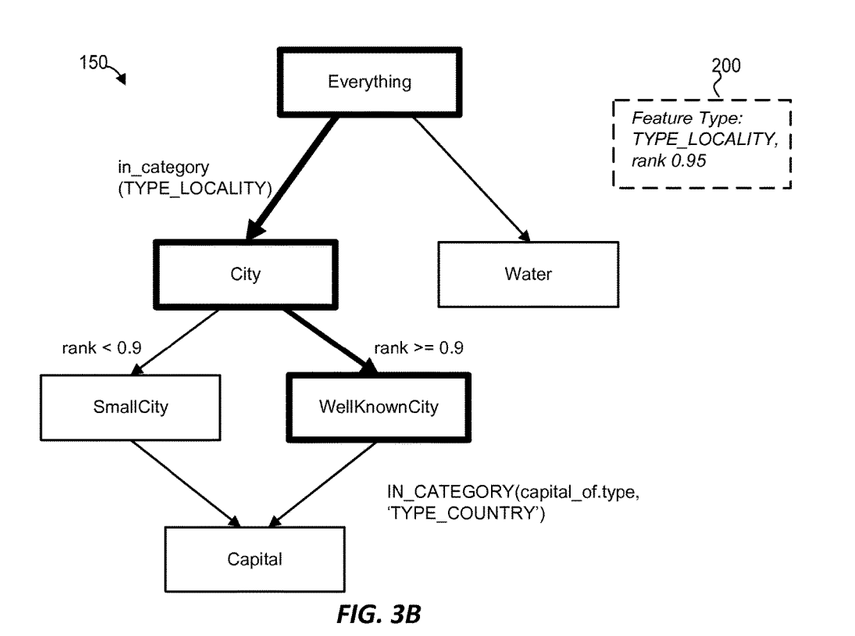
FIG. 3B schematically illustrates traversal of the data structure of FIG. 3A to determine configuration parameters for a certain feature, where applicable configuration parameters are identified at two levels of the hierarchy.

Now referring to FIG. 3B, the style graph 26 or another suitable component can traverse the data structure 150 to identify configuration parameters that apply to map feature 200. As schematically illustrated in FIG. 3B, the map feature 200 is of type "locality" having a rank of 0.95. The map feature can be a label. The rank of the map feature 200 can be any numeric value that can be compared to numeric values of the same type defined as parts of node filters. It is noted, however, that the numeric rank is merely an example of a value associated with a map feature using which the map feature can be tested against some of the nodes of the data structure 150. In contrast to the rank of the map feature 200, the indicator TYPE_LOCALITY corresponds to a value in an enumerated type.

The style graph/table generator 26 begins traversing the data structure 150 at root node "Everything." The style graph/table generator 26 begins to construct a set of configuration parameters for the map feature 200 by applying the configuration parameters at node "Everything." However, as indicated above, the graph/table generator 26 can override some of these parameters if a descendant node is found to match the map feature 200 and defines different parameters for the same visual attribute (e.g., text color).

The style graph/table generator 26 compares the enumerated value TYPE_LOCALITY to values of the same type included in the filter of node "City." Because the filter of node "City" indicates that TYPE_LOCALITY applies to the node, the style graph/table generator 26 expands (or partially overrides) the set of configuration parameters for the map feature 200 with the configuration parameters at node "City." In line with the "one-sibling" rule, the style graph/table generator 26 in this example does not process node "Water" at all. It is also noted that node "City" may not indicate any rank values, and the rank of 0.95 of the map feature 200 may not be a factor in selecting the "Everything"→"City" part of the path.

Next, the style graph/table generator 26 determines which of the child nodes of node "City," if any, further applies to the map feature 200. Node "SmallCity" in this example configuration is an older sibling of node "WellKnownCity," and so the style graph/table generator 26 first compares the filter of node "SmallCity" to the properties of the map feature 200. Because the filter of node "SmallCity" indicates the rank of 0.9 and below, the style graph/table generator 26 proceeds to node "WellKnownCity," whose rank of 0.9 and above matches the rank of 0.95. The style graph/table generator 26 accordingly applies the configuration parameters of node "WellKnownCity" to the set of configuration parameters of the map feature 200.

The style graph/table generator 26 next proceeds to the only child of node "WellKnownCity," "Capital." The style graph/table generator 26 determines there is no match between the filter at node "Capital" and the properties of the map feature 200, and ends the traversal of the data structure 150. The resulting path of the map feature 200 through the data structure is schematically illustrated in FIG. 3A using thicker lines.

Figure 3C:
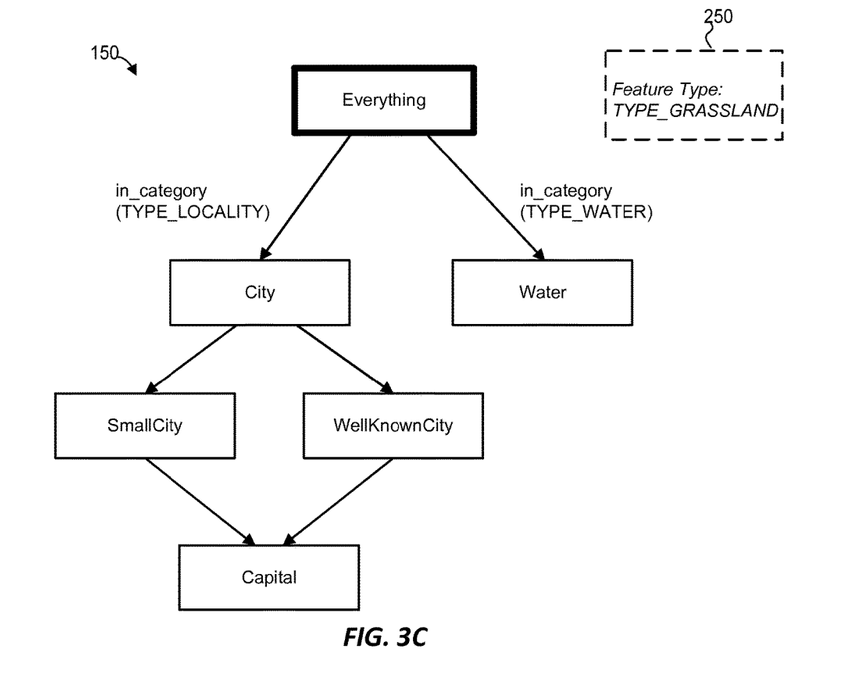
FIG. 3C schematically illustrates traversal of the data structure of FIG. 3A to determine configuration parameters for another feature, where applicable configuration parameters are identified only at a root node.

FIG. 3C illustrates another example traversal, where a map feature 250 is of type "grassland," and has no other properties that can be compared to the node filters of the data structure 150. The style graph/table generator 26 first compares the type "grassland" to the type "locality" filter of the oldest sibling, node "City," and then compares the type "grassland" to the type "water" filter of the younger sibling, node "Water." Because there is no match, and because node "Everything" has no other children, the style graph/table generator 26 stops the traversal. As a result, the map feature 250 acquires only the configuration parameters available at root node "Everything."

Figure 3D:
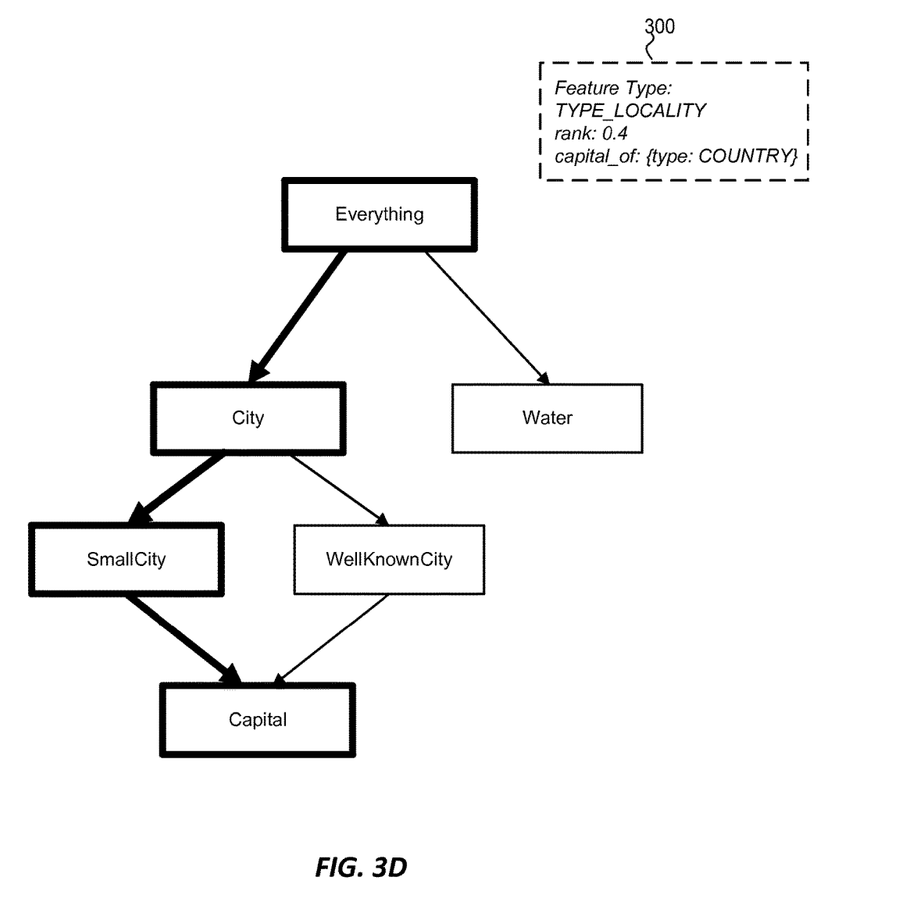
FIG. 3D schematically illustrates traversal of the data structure of FIG. 3A to determine configuration parameters for yet another feature, where applicable configuration parameters are identified at four levels of the hierarchy.

Another example traversal is discussed next with reference to FIG. 3D. A map feature 300 is of type "locality," has a rank of 0.4, and has the property (or attribute) "capital of country." The property "capital of country" is structured as a "capital of" indicator for a subtype "country." The style graph/table generator 26 in this case finds matches, and accordingly selects respective configuration parameters from, nodes "Everything," "City," "SmallCity," and "Capital."

Referring generally to FIGS. 3A-D, a path which a map feature follows through the data structure 150 can define a style identifier for the resulting set of configuration parameters. For example, the path of the map feature 200 is "Everything"→"City"→"WellKnownCity," the path of the map feature 250 is simply "Everything," and the path of the map feature 300 is ""Everything"→"City"→"SmallCity"→"Capital." These paths can be converted to numeric values using any suitable technique, such as by masking in values at different levels of hierarchy (e.g., "Everything"=0xF0000000, "City"=0x01000000). Each set of configuration parameters generated as a result of traversing the data structure 150 for a certain map feature can be structured as an entry in a table, with the style identifier serving as an index.

Thus, the style graph/table generator 26 can traverse certain portions or the entirety of the data structure 150 to flatten the graph and generate one or several tables for use by client devices and/or network servers that rasterize map data. The style graph/table generator 26 then can provide the flattened graph or portion of the graph to the client device 20 as a static resource.

It is noted that the approach illustrated in this disclosure allows the system 10 to limit the number of styles generated based on a graph to only those styles that are likely to be used with certain map tiles. Further, implementing the data structure 150 as a graph allows configuration parameters to be defined independently, allowing nodes to be shared. In the example configuration of FIGS. 3A-D, text size can be a function of rank, but icon selection depends on whether the city is a capital. By allowing operators to define multiple parent nodes, the system 10 reduces the overall number of nodes that need to be maintained. More particularly, rather than including nodes "SmallCapitalCity" and "WellKnownCapitalCity," the data structure 150 includes a single node "captial," and the style graph/table generator 26 when needed can generate sub-paths "SmallCity"→"Capital" and "WellKnownCity"→"Capital."

Operator Interface

Figure 4:
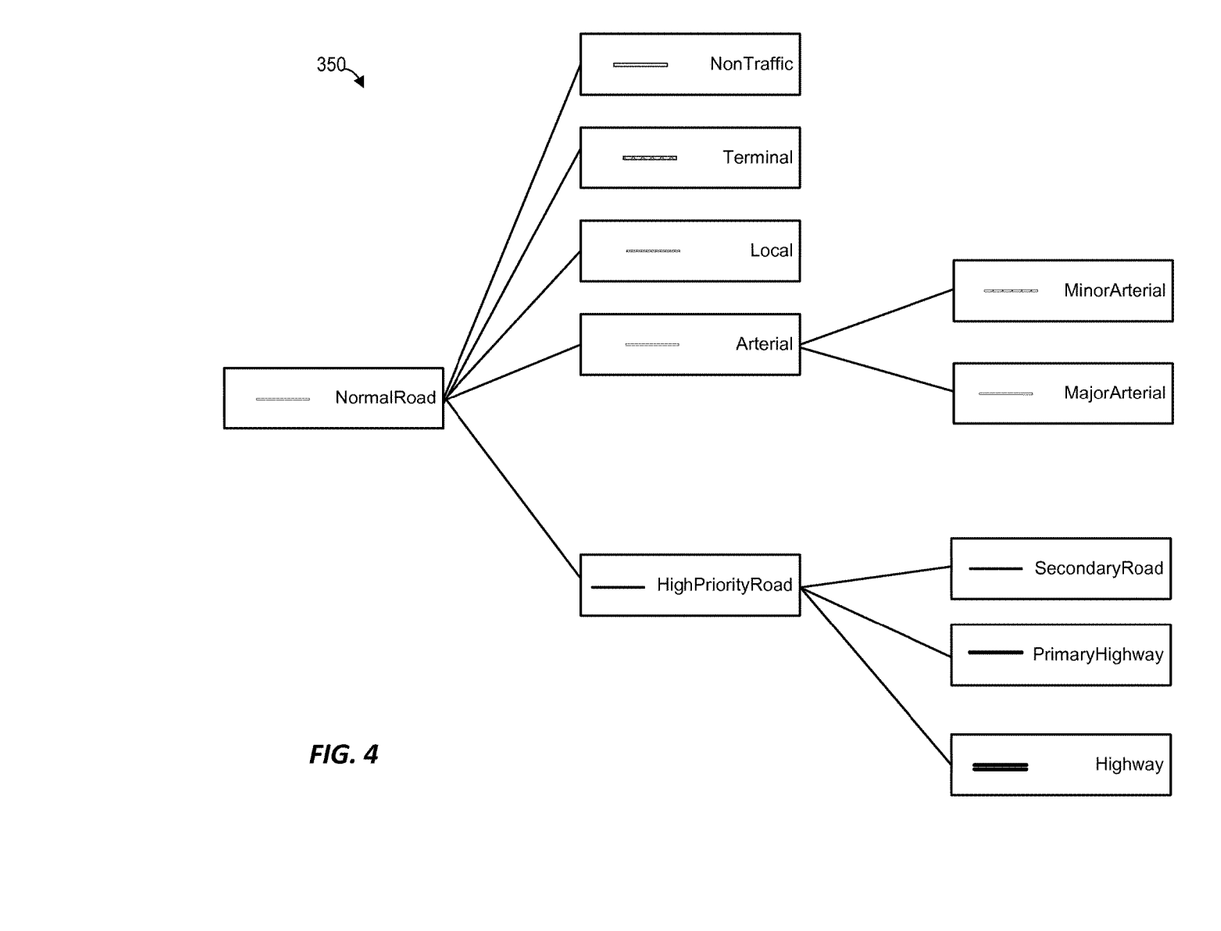
FIG. 4 is an example visualization of a data structure that stores configuration parameters for various types of road map features, which the workstation of FIG. 1 can display to an operator.

The style graph/table generator 26 can represent the data structure 150 as a human-readable text file. In this manner, the user can easily view the relationships between nodes, edit the defined relationships, etc. Moreover, the system 10 can present a visualization of the data structure 150 via the style specification interface 50 (see FIG. 1), for example. The visualization 350 can be similar to a visualization 350 illustrated in FIG. 4. The visualization 350 illustrates to an operator how visual styles are generated for roads of various types. In addition to illustrating relationships between nodes, the visualization 350 depicts example road segments rendered according to the corresponding styles.

In various implementations, the style specification interface 50 can provide various controls for editing nodes, deleting nodes, viewing inheritance, testing relationships, etc. Further, the style specification interface 50 in some implementations can require that the operator declare the nearest oldest sibling for each node, so that the operator can verify whether he or she inadvertently defined overlapping filters for the siblings, for example.

Example Method for Organizing Configuration Parameters

Figure 5:
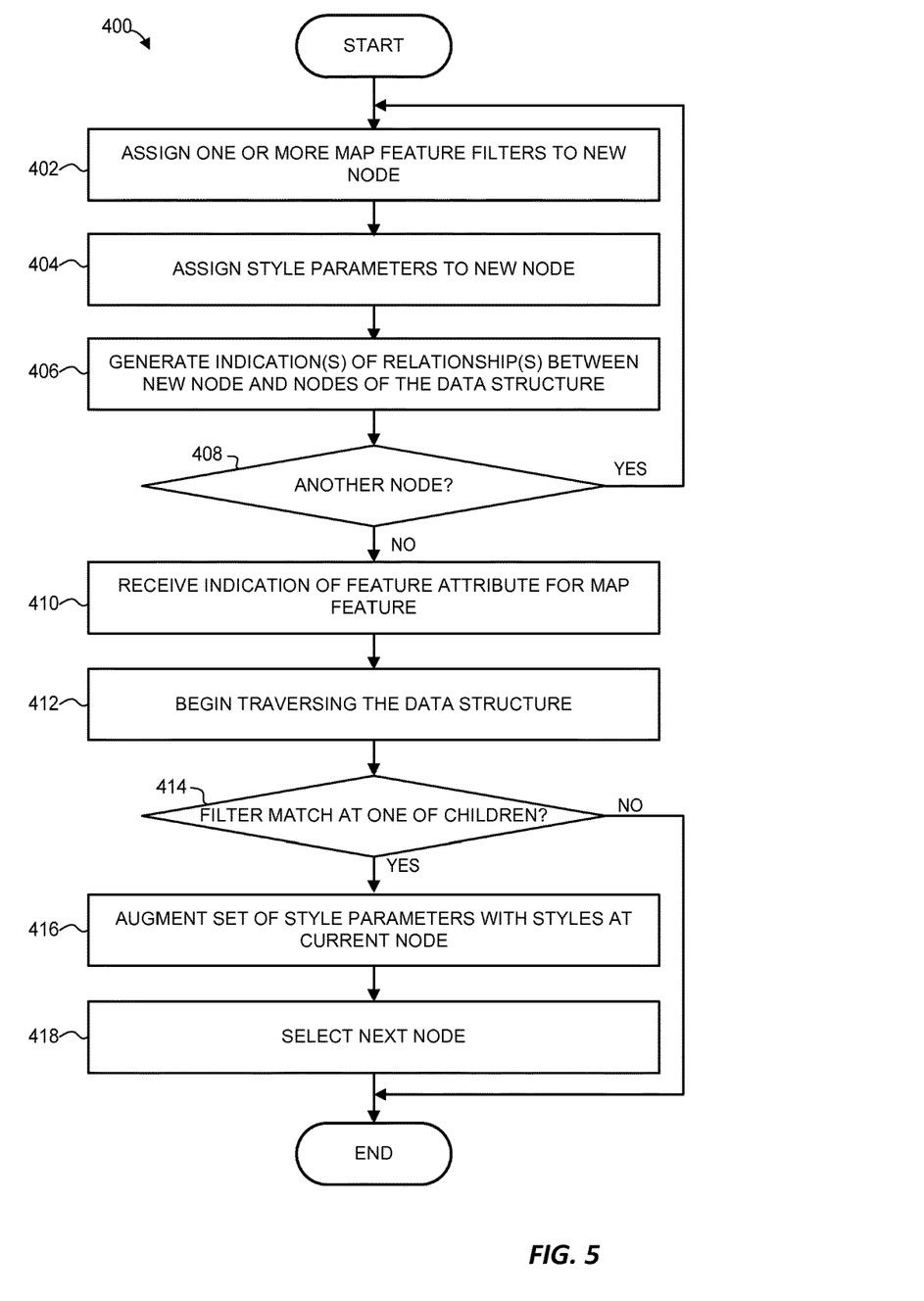
FIG. 5 is a flow diagram of an example method for organizing configuration parameters into a data structure of this disclosure, which can be implemented in the system of FIG. 1.

FIG. 5 illustrates a flow diagram 400 of an example method for organizing configuration parameters into a data structure similar to the data structure 150 discussed above. In some implementations, the method 400 is at least partially implemented in the style graph/table generator 26 and/or the style specification interface 50, as one or more sets of instructions stored on a non-transitory computer-readable medium and executable on one or more computing devices.

At blocks 402-408, a data structure storing configuration parameters is constructed. In particular, at block 402, one or more filters or map feature attributes are assigned to a new node for use in filtering. For example, an operator using the workstation 40 can generate a new node and assign types "neighborhood" and "locality" to the node. Next, at block 404, configuration parameters are received and assigned to the node. As discussed above with reference to node data 180, any number of configuration parameters of various types can be assigned to a node. Further, at block 406, an indication of a relationship between the new node and one or more pre-existing nodes of the data structure can be received. For example, the user can indicate that the new node is a child of a certain pre-existing node, a younger sibling of another pre-existing node, etc. In some implementations, additional data can be received to configure a new node or, conversely, some of the data discussed with reference to block 402-406 is not received. If the operator wishes to configure another node (block 408), the flow returns to block 402. Otherwise, the flow proceeds to block 410.

At blocks 410-418, configuration parameters are generated for a map feature using the data structure. In one implementation, the blocks 410-418 are implemented in the style graph/table generator 26. At block 410, an indication of at least one feature property or attribute is received. For example, property "locality" and rank of "0.8" can be received for a certain map feature, which can be an interactive icon representing a selectable point of interest on a map. As discussed with reference to FIGS. 3A-D above, any number of properties can be specified for a map feature for comparison to filters at various nodes of a data structure.

At block 412, the software component that implements the method 400 begins to traverse the data structure. In particular, the one or more properties received at block 410 are compared to filters at one or more nodes of the root data structure, starting with the root node. Next, it is determined at block 414 whether the properties of the map feature match any of the filters of the children nodes, where it is possible that zero or only one child may match. In one implementation, the children are "visited" in the "oldest-to-youngest" order, with the first match ending the analysis of the siblings. If there is a match, the set of style properties for the map feature is augmented with the configuration parameters associated with the node (block 416), and the flow proceeds to block 418. Otherwise, the method 400 ends. At block 418, the next node is selected, provided the node matched at block 414 has children.

More generally, this and other techniques discussed above can apply to other mapping systems, such as systems that print map images on paper. Further, at least some of the techniques for organizing configuration parameters discussed above can be used with other types of data, such as gaming data (e.g., organizing virtual characters), for example.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain implementations are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some implementations may be described using the expression "coupled" and "connected" along with their derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of various implementations. This description should be read to include one or at least one and the singular also includes the plural unless it is obvious that it is meant otherwise.

Upon reading this disclosure, those of ordinary skill in the art will appreciate still additional alternative structural and functional designs for dynamically styling offline map data through the disclosed principles herein. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for rendering map features on digital maps, the method comprising:
   generating, by one or more computing devices, a data structure storing data for a plurality of nodes, wherein the generating includes:
   assigning, to the plurality of nodes by the one or more computing devices, (i) respective sets of map feature attributes and (ii) respective sets of configuration parameters that specify styling visual attributes for rendering map features, and
   generating, by the one or more computing devices, indications of relationships between the plurality of nodes, wherein at least several of the plurality of nodes include several child nodes;
   receiving, by the one or more computing devices, an indication of one or more map feature attributes to which a certain map feature belongs;
   traversing, by the one or more computing devices, the data structure according to the indicated relationships between the plurality of nodes to generate a set of configuration parameters for rendering the certain map feature, including comparing the indicated one or more map feature attributes of the certain map feature to sets of map feature attributes at some of the plurality of nodes, wherein the generated set of configuration parameters includes configuration parameters from at least two of the plurality of nodes; and
   causing a digital map to be rendered by applying, for each map feature included in the digital map, the styling visual attributes specified by the corresponding generated set of configuration parameters when rendering the map feature.

2. The method of claim 1, further comprising:
   traversing, by the one or more computing devices, the data structure a plurality of times for a multiplicity of map features to flatten at least a portion of the data structure so as to generate a style table for the multiplicity of map features; and
   causing, by the one or more computing devices, the style table for the multiplicity of map features to be transmitted to a client device via a communication network.

3. The method of claim 2, further comprising generating indices into the style table based on paths formed by the traversing of the data structure according to the indicated relationships between the plurality of nodes.

4. The method of claim 2, generating the data structure includes implementing, by the one or computing devices, a directed acyclic graph.

5. The method of claim 4, wherein traversing the data structure includes traversing the directed acyclic graph depth-first.

6. The method of claim 1, wherein assigning the sets of configuration parameters includes assigning indications of one or more of:
   (i) line thickness,
   (ii) line color,
   (iii) fill color, and
   (iv) text color.

7. The method of claim 6, wherein assigning the sets of configuration parameters further includes assigning indications of one or more scales or zoom levels to which the configuration parameters apply.

8. A method for providing configuration parameters for rendering map features on client devices, the method comprising:
- accessing, by one or more computing devices, a data structure that implements a graph having a plurality of nodes, wherein each node indicates (i) a respective set of map feature attributes and (ii) a respective set of configuration parameters that specify styling visual attributes for rendering map features, and wherein the data structure indicates at least parent-child relationships between the plurality of nodes;
- traversing, by the one or more computing devices, at least a portion of the data structure according to the indicated relationships between the plurality of nodes to generate a flattened representation of the at least a portion of the data structure, wherein the traversing includes combining, by the one or more computing devices, configuration parameters for at least two of the plurality of nodes to generate a set of configuration of parameters; and
- causing, by the one or more computing devices, the flattened representation to be transmitted to a client device via a communication network, for applying to map features when rendering a digital map.

9. The method of claim 8, wherein generating the flattened representation of the at least a portion of the data structure includes:
- generating, by the one or more computing devices, a style table for a plurality of map features, including traversing the data structure a plurality of times along to respective paths to generate, in each instance, a table entry for a respective one of the plurality of map features, wherein the table entry includes configuration parameters from several nodes on the corresponding path.

10. The method of claim 8, wherein the data structure further indicates, for at least one of the plurality of nodes, a nearest older sibling node selected from among the plurality of nodes, wherein traversing the data structure includes visiting the nearest older sibling node prior to determining whether the selected one of the plurality of nodes should be visited.

11. The method of claim 10, including receiving an indication of the nearest older sibling node from an operator via a user interface.

12. A system comprising:
- a non-transitory computer-readable memory;
- processing hardware coupled to the computer-readable memory, the processing hardware configured to:
  - generate data structure storing data for a plurality of nodes, including assign, to the plurality of nodes (i) respective sets of map feature attributes and (ii) respective sets of configuration parameters that specify styling visual attributes for rendering map features, and generate indications of relationships between the plurality of nodes, wherein at least several of the plurality of nodes include several child nodes,
  - receive an indication of one or more map feature attributes to which a certain map feature belongs,
  - traverse the data structure according to the indicated relationships between the plurality of nodes to generate a set of configuration parameters for rendering the certain map feature, including compare the indicated one or more map feature attributes of the certain map feature to sets of map feature attributes at some of the plurality of nodes, wherein the generated set of configuration parameters includes configuration parameters from at least two of the plurality of nodes, and
  - cause a digital map to be rendered by applying, for each map feature included in the digital map, the styling visual attributes specified by the corresponding generated set of configuration parameters when rendering the map feature.

13. The system of claim 12, wherein the processing hardware is further configured to:
- traverse the data structure a plurality of times for a multiplicity of map features to flatten at least a portion of the data structure so as to generate a style table for the multiplicity of map features; and
- cause the style table for the multiplicity of map features to be transmitted to a client device via a communication network.

14. The system of claim 13, wherein the processing hardware is further configured to generate indices into the style table based on paths formed by the traversing of the data structure according to the indicated relationships between the plurality of nodes.

15. The system of claim 13, wherein to generate the data structure, the processing hardware is further configured to implement a directed acyclic graph.

16. The system of claim 15, wherein the processing hardware is further configured to traverse the directed acyclic graph depth-first.

17. The system of claim 12, wherein to generate the data structure, the processing hardware is further configured to:
- for a selected one of the plurality of nodes, receive a selection a nearest older sibling node selected from among the plurality of nodes, wherein to traverse the data structure, the processing hardware is configured to visit the nearest older sibling node prior to determining whether the selected one of the plurality of nodes should be visited.

* * * * *